US011681713B2

(12) United States Patent
Duzhik et al.

(10) Patent No.: US 11,681,713 B2
(45) Date of Patent: Jun. 20, 2023

(54) METHOD OF AND SYSTEM FOR RANKING SEARCH RESULTS USING MACHINE LEARNING ALGORITHM

(71) Applicant: YANDEX EUROPE AG, Lucerne (CH)

(72) Inventors: Valery Ivanovich Duzhik, Minsk (BY); Andrey Dmitrievich Drozdovsky, Moscow (RU); Oleg Pavlovich Naydin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 1026 days.

(21) Appl. No.: 16/277,088

(22) Filed: Feb. 15, 2019

(65) Prior Publication Data

US 2019/0391982 A1 Dec. 26, 2019

(30) Foreign Application Priority Data

Jun. 21, 2018 (RU) .................................. 2018122689

(51) Int. Cl.
*G06F 16/00* (2019.01)
*G06F 7/00* (2006.01)
(Continued)

(52) U.S. Cl.
CPC ...... *G06F 16/24578* (2019.01); *G06F 16/953* (2019.01)

(58) Field of Classification Search
CPC .......................... G06F 16/24578; G06F 16/953
(Continued)

(56) References Cited

U.S. PATENT DOCUMENTS 6,006,225 A 12/1999 Bowman et al.
6,185,558 B1 2/2001 Bowman et al.
(Continued)

FOREIGN PATENT DOCUMENTS

CN 106095983 A 11/2016
JP 2008181186 A 8/2008
(Continued)

OTHER PUBLICATIONS

Office Action with regard to the counterpart U.S. Appl. No. 16/190,441 dated Oct. 21, 2020.
(Continued)

*Primary Examiner* — Raquel Perez-Arroyo
(74) *Attorney, Agent, or Firm* — BCF LLP

(57) ABSTRACT

A method and a system for ranking search results using a machine learning algorithm (MLA), the MLA having been trained to determine query similarity based on textual content thereof, comprising: receiving a new query, retrieving a plurality of search queries, computing a respective similarity parameter between the new query and each query of the plurality of search queries, selecting a given past query associated with a highest respective similarity parameter, retrieving a set of search results associated with the given past query, each of the set of search results being associated with an annotation including respective search queries, and computing for each respective one of the plurality of respective search queries having been used to access the respective search result, a respective second similarity parameter, and using the respective second similarity parameter as a ranking feature for ranking the associated search results as search results for the new query.

22 Claims, 7 Drawing Sheets

(51) Int. Cl.
*G06F 16/2457* (2019.01)
*G06F 16/953* (2019.01)

(58) Field of Classification Search
USPC .................................................... 707/706
See application file for complete search history.

(56) References Cited

U.S. PATENT DOCUMENTS

| | | | |
|---|---|---|---|
| 6,189,002 B1 | 2/2001 | Roitblat |
| 6,269,368 B1 | 7/2001 | Diamond |
| 6,701,311 B2 | 3/2004 | Biebesheimer et al. |
| 6,738,764 B2 | 5/2004 | Mao et al. |
| 7,296,016 B1 | 11/2007 | Farach-Colton et al. |
| 7,523,105 B2 | 4/2009 | Wen et al. |
| 7,574,426 B1 | 8/2009 | Ortega |
| 7,577,643 B2 | 8/2009 | Dominowska et al. |
| 7,603,348 B2 | 10/2009 | He et al. |
| 7,689,585 B2 | 3/2010 | Zeng et al. |
| 7,877,385 B2 | 1/2011 | Craswell et al. |
| 7,877,404 B2 | 1/2011 | Achan et al. |
| 7,895,235 B2 | 2/2011 | Baeza-Yates et al. |
| 7,921,119 B2 | 4/2011 | Bowman et al. |
| 7,958,115 B2 | 6/2011 | Kraft |
| 7,958,158 B2 | 6/2011 | Bestgen et al. |
| 8,086,619 B2 | 12/2011 | Haahr et al. |
| 8,135,698 B2 | 3/2012 | Dettinger et al. |
| 8,145,623 B1 | 3/2012 | Mehta et al. |
| 8,156,129 B2 | 4/2012 | Zhou et al. |
| 8,214,363 B2 | 7/2012 | Chaudhary |
| 8,239,334 B2 | 8/2012 | Yan et al. |
| 8,239,370 B2 | 8/2012 | Wong et al. |
| 8,321,448 B2 | 11/2012 | Zeng et al. |
| 8,359,282 B2 | 1/2013 | Bai et al. |
| 8,392,436 B2 | 3/2013 | Bai et al. |
| 8,423,547 B2 | 4/2013 | Liu et al. |
| 8,452,758 B2 | 5/2013 | Tong et al. |
| 8,463,595 B1 | 6/2013 | Rehling et al. |
| 8,533,130 B2 | 9/2013 | Ershov |
| 8,543,668 B1 | 9/2013 | Long |
| 8,606,786 B2 | 12/2013 | Rounthwaite et al. |
| 8,612,367 B2 | 12/2013 | Xu et al. |
| 8,626,758 B2 | 1/2014 | Alspector et al. |
| 8,645,390 B1 | 2/2014 | Oztekin et al. |
| 8,655,868 B2 | 2/2014 | Parikh et al. |
| 8,655,872 B2 | 2/2014 | Kraft |
| 8,719,257 B2 | 5/2014 | Rangan |
| 8,762,365 B1 | 6/2014 | Pantel et al. |
| 8,775,442 B2 | 7/2014 | Moore et al. |
| 8,788,477 B1 | 7/2014 | Jung et al. |
| 8,825,571 B1 * | 9/2014 | Alfonseca .............. G06N 5/022 706/12 |
| 8,898,156 B2 | 11/2014 | Xu et al. |
| 9,009,146 B1 | 4/2015 | Lopatenko et al. |
| 9,009,148 B2 | 4/2015 | Gao et al. |
| 9,064,007 B1 | 6/2015 | Jacobsson et al. |
| 9,098,571 B2 | 8/2015 | Achuthan et al. |
| 9,104,733 B2 | 8/2015 | Gao et al. |
| 9,183,323 B1 | 11/2015 | Shaw |
| 9,251,292 B2 | 2/2016 | Cheng et al. |
| 9,400,838 B2 | 7/2016 | Musgrove et al. |
| 9,477,654 B2 | 10/2016 | He et al. |
| 9,507,861 B2 | 11/2016 | Ali et al. |
| 9,519,859 B2 | 12/2016 | Huang et al. |
| 9,535,960 B2 | 1/2017 | Guo et al. |
| 9,633,017 B2 | 4/2017 | Yi et al. |
| 9,659,248 B1 | 5/2017 | Barbosa et al. |
| 9,715,660 B2 | 7/2017 | Parada et al. |
| 9,720,904 B2 | 8/2017 | Ikawa et al. |
| 9,767,182 B1 | 9/2017 | Thakur et al. |
| 9,773,256 B1 | 9/2017 | Frumkin et al. |
| 9,898,554 B2 | 2/2018 | Gupta et al. |
| 9,916,366 B1 * | 3/2018 | Shukla ................ G06F 16/144 |
| 10,089,580 B2 | 10/2018 | Shan et al. |
| 10,909,196 B1 | 2/2021 | Suzuki et al. |
| 10,915,524 B1 | 2/2021 | Gupta et al. |
| 11,126,921 B2 | 9/2021 | Conroy et al. |
| 2004/0249808 A1 | 12/2004 | Azzam et al. |
| 2006/0136411 A1 | 6/2006 | Meyerzon et al. |
| 2006/0149710 A1 | 7/2006 | Koningstein et al. |
| 2006/0294071 A1 | 12/2006 | Weare et al. |
| 2007/0005587 A1 | 1/2007 | Johnson et al. |
| 2007/0061333 A1 | 3/2007 | Ramer et al. |
| 2007/0150466 A1 | 6/2007 | Brave et al. |
| 2008/0109285 A1 | 5/2008 | Reuther et al. |
| 2008/0114750 A1 | 5/2008 | Saxena et al. |
| 2009/0063460 A1 | 3/2009 | Selberg |
| 2009/0070299 A1 | 3/2009 | Parikh et al. |
| 2009/0234711 A1 | 9/2009 | Ramer et al. |
| 2009/0241066 A1 | 9/2009 | Costello |
| 2009/0248661 A1 | 10/2009 | Bilenko et al. |
| 2009/0254512 A1 | 10/2009 | Broder et al. |
| 2009/0313286 A1 | 12/2009 | Mishra et al. |
| 2010/0010895 A1 | 1/2010 | Gabrilovich et al. |
| 2010/0082582 A1 | 4/2010 | Gao et al. |
| 2010/0185649 A1 | 7/2010 | Zhou et al. |
| 2010/0198816 A1 | 8/2010 | Kwan |
| 2010/0312764 A1 | 12/2010 | Liao et al. |
| 2010/0332493 A1 | 12/2010 | Haas et al. |
| 2011/0004588 A1 | 1/2011 | Leitersdorf et al. |
| 2011/0238662 A1 | 9/2011 | Shuster et al. |
| 2011/0264651 A1 | 10/2011 | Selvaraj et al. |
| 2012/0143790 A1 | 6/2012 | Wang et al. |
| 2012/0158685 A1 | 6/2012 | White et al. |
| 2012/0203717 A1 | 8/2012 | Xu et al. |
| 2012/0253792 A1 | 10/2012 | Bespalov et al. |
| 2013/0024443 A1 | 1/2013 | Achuthan et al. |
| 2013/0110824 A1 | 5/2013 | Derose et al. |
| 2013/0246412 A1 | 9/2013 | Shokouhi et al. |
| 2013/0282704 A1 | 10/2013 | Pantel et al. |
| 2015/0186938 A1 | 7/2015 | Zhang et al. |
| 2015/0248454 A1 | 9/2015 | Muraoka et al. |
| 2015/0262077 A1 | 9/2015 | White et al. |
| 2015/0310527 A1 | 10/2015 | Warren et al. |
| 2015/0347519 A1 | 12/2015 | Hornkvist et al. |
| 2015/0356199 A1 | 12/2015 | Mei et al. |
| 2015/0363688 A1 | 12/2015 | Gao et al. |
| 2016/0042296 A1 | 2/2016 | Shan et al. |
| 2016/0085740 A1 | 3/2016 | Ikawa et al. |
| 2016/0299899 A1 | 10/2016 | Logachev |
| 2016/0321321 A1 | 11/2016 | Huang |
| 2016/0321367 A1 | 11/2016 | Arya et al. |
| 2017/0011289 A1 | 1/2017 | Gao et al. |
| 2017/0060844 A1 | 3/2017 | He et al. |
| 2017/0060993 A1 | 3/2017 | Pendar et al. |
| 2017/0061294 A1 | 3/2017 | Weston et al. |
| 2017/0083523 A1 | 3/2017 | Philip et al. |
| 2017/0124447 A1 | 5/2017 | Chang et al. |
| 2017/0235819 A1 * | 8/2017 | Liao .................... G06F 16/3326 707/733 |
| 2017/0249311 A1 * | 8/2017 | Pelleg ...................... G06N 5/04 |
| 2017/0262449 A1 | 9/2017 | Venkataraman et al. |
| 2017/0286835 A1 | 10/2017 | Ho et al. |
| 2017/0300828 A1 | 10/2017 | Feng et al. |
| 2017/0344555 A1 | 11/2017 | Yan et al. |
| 2018/0032897 A1 | 2/2018 | Cao et al. |
| 2018/0052853 A1 | 2/2018 | Rickard et al. |
| 2018/0121550 A1 | 5/2018 | Jeon et al. |
| 2018/0150466 A1 | 5/2018 | Paquet et al. |
| 2019/0034793 A1 | 1/2019 | Kataria et al. |
| 2019/0188295 A1 | 6/2019 | Sirotkovic et al. |
| 2019/0205472 A1 | 7/2019 | Kulkarni |
| 2019/0236132 A1 | 8/2019 | Zhu et al. |
| 2019/0258722 A1 | 8/2019 | Guo et al. |
| 2019/0294692 A1 | 9/2019 | Zhao et al. |
| 2019/0340256 A1 | 11/2019 | Kulkarni |
| 2019/0370605 A1 | 12/2019 | Xie et al. |
| 2020/0004886 A1 | 1/2020 | Ramanath et al. |
| 2020/0082212 A1 | 3/2020 | Alcock et al. |

FOREIGN PATENT DOCUMENTS

| | | | |
|---|---|---|---|
| KR | 20100069118 A | 6/2010 |
| RU | 2556425 C1 | 7/2015 |
| RU | 2609079 C2 | 1/2017 |

(56) References Cited

FOREIGN PATENT DOCUMENTS

| RU | 2632143 C1 | 10/2017 |
|---|---|---|
| RU | 2637998 C1 | 12/2017 |
| RU | 2643466 C1 | 2/2018 |

OTHER PUBLICATIONS

Search Report with regard the counterpart RU Patent Application No. 2018144177 completed May 21, 2020.
Office Action with regard to the counterpart U.S. Appl. No. 16/190,441 dated Jun. 11, 2020.
Office Action with regard the counterpart U.S. Appl. No. 16/571,870 dated Jul. 13, 2021.
Eugene Opoku-Mensah et al., "Understanding User Situational Relevance in Ranking Web Search Results", IEEE, pp. 405-410, Nov. 23, 2017.
Yongjian Liu et al., "The Research Of Optimizing Page Ranking Based On User's Feature", IEEE, pp. 1950-1952, Oct. 4, 2012.
McCreadie et al., "A Study of Personalised Medical Literature Search", In: Kanoulas E et al. (eds) Information Access Evaluation. Multilinguality, Multimodality, and Interaction. CLEF 2014. Lecture Notes in Computer Science, vol. 8685. Springer, Cham, https://doi.org/10.1007/978-3-319-11382-1_8, Abstract, 7 pages.
Gao et al., "Clickthrough-Based Translation Models for Web Search: from Word Models to Phrase Models", CIKM'10, Oct. 26-29, 2010, Toronto, Ontario, Canada, 10 pages.
Gao et al., "Clickthrough-Based Latent Semantic Models for Web Search", SIGIR'11, Jul. 24-28, 2011, Beijing, P. R. China, 10 pages.
Office Action with regard to the U.S. Appl. No. 16/387,679 dated May 12, 2021.
Notice of Allowance with regard to the U.S. Appl. No. 16/387,679 dated Jul. 21, 2021.
Baeza-Yates, "Graphs from Search Engine Queries", International Conference on Current Trends in Theory and Practice of Computer Science, SOFSEM 2007: Theory and Practice of Computer Science, https://link.springer.com/chapter/10.1007/978-3-540-69507-3_1, Abstract, 4 pages.
English Abstract for JP2008181186 retrieved on Espacenet on May 3, 2018.
English Abstract for KR20100069118 retrieved on Espacenet on May 3, 2018.
Huang et al., "Learning Deep Structured Semantic Models for Web Search using Clickthrough Data", CIKM'13, 2013, USA, 8 pages.
Wen et al., "Query Clustering Using User Logs", ACM Transactions on Information Systems, vol. 20, No. 1, 2002, pp. 59-81.
Wen et al., "Clustering User Queries of a Search Engine", WWW10, 2001, Hong Kong, 14 pages, http://vwwconference.org/www10/cdrom/papers/368/index.html.
Beeferman et al., "Agglomerative clustering of a search engine query log", Agglomerative clustering of a search engine query log, 2000, USA, 10 pages.
"DSSM", Microsoft Research, 2015, 4 pages, https://www.microsoft.com/en-us/research/project/dssm/.
English Abstract for CN 106095983 retrieved on Espacenet on May 9, 2018.
Search Report with regard to the RU counterpart patent application No. 2017146890 completed Dec. 13, 2019.
Search Report with regard to the RU counterpart patent application No. 2018122689 completed Jan. 28, 2020.
Office Action with regard the counterpart U.S. Appl. No. 16/571,870 dated Aug. 27, 2021.
Office Action with regard to the U.S. Appl. No. 16/571,847 dated May 25, 2022.

* cited by examiner

500

470 ⟶ $<q_1, q_2, S_{q_1 q_2}>, <q_1, q_3, S_{q_1 q_3}>, \ldots, <q_1, q_n, S_{q_1 q_n}>$

METHOD OF AND SYSTEM FOR RANKING SEARCH RESULTS USING MACHINE LEARNING ALGORITHM

CROSS-REFERENCE

The present application claims priority to Russian Patent Application No. 2018122689, entitled "Method of and System for Ranking Search Results Using Machine Learning Algorithm," filed Jun. 21, 2018, the entirety of which is incorporated by reference.

FIELD

The present technology relates to machine learning algorithms in general and, more specifically, to a method of and a system for ranking search results using a machine learning algorithm.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

U.S. Pat. No. 8,898,156 B2 titled "Query expansion for web search" and granted on Nov. 25, 2014 to Microsoft teaches systems, methods, and devices for retrieving query results based at least in part on a query and one or more similar queries. Upon receiving a query, one or more similar queries may be identified and/or calculated. In one embodiment, the similar queries may be determined based at least in part on click-through data corresponding to previously submitted queries. Information associated with the query and each of the similar queries may be retrieved, ranked, and or combined. The combined query results may then be re-ranked based at least in part on a responsiveness and/or relevance to the previously submitted query. The re-ranked query results may then be output to a user that submitted the original query.

U.S. Pat. No. 8,606,786 titled "Determining a similarity measure between queries" and granted on Dec. 10, 2013 to Microsoft teaches a system including a receiver component that receives a dataset that is stored in a computer-readable medium of a computing device, wherein the dataset includes a plurality of queries issued by users to a search engine and a plurality of search results selected by the users upon issuing the plurality of queries. A distribution determiner component determines click distributions over the search results selected by the users with respect to the plurality of queries. A labeler component labels at least two queries in the plurality of queries as being substantially similar to one another based at least in part upon the click distributions over the search results selected by the users with respect to the plurality of queries.

U.S. Pat. No. 9,009,146 B1 titled "Ranking search results based on similar queries" and granted on Apr. 14, 2015 to Google LLC teaches a computer-implemented method for providing input to a document ranking process for ranking a plurality of documents, the document ranking process taking as input a quality of result statistic for an individual document in the plurality of documents, the plurality of documents having been identified in response to a query, the quality of results statistic being for the query and the individual document. The method for providing input can include, for a first document identified as a search result of a user-submitted query, scoring one or more other queries based upon a similarity to the user-submitted query, each of the one or more other queries being different from the user-submitted query.

SUMMARY

Developer(s) of the present technology have appreciated at least one technical problem associated with the prior art approaches.

Developer(s) of the present technology have developed embodiments of the present technology based on a class of deep representation learning models known as a Deep Structured Semantic Model (DSSM). Briefly speaking, DSSM is a deep neural network that receives as an input queries and documents, and projects them into a common low-dimensional space where the relevance of a document given a query is computed as the distance between them. Such an approach is usually combined with word hashing techniques, which allows for handling large vocabularies and scale up semantic models used by the DSSM. DSSM allows predicting relationships between two texts based on user behavior.

The present technology is configured to generate features and training data for a neural network based on a modified variation of the DSSM. The DSSM is trained to predict closeness of two search queries—a new search query and a previously-seen search query. This knowledge of predicted search query closeness enables generating an additional ranking feature—based on the knowledge (for example, of past user interactions with documents shown to past users associated with the previously-seen search query) associated with the previously-seen search query, which additional ranking feature may then be used by ranking algorithms, such as MatrixNet ranking system used by YANDEX™ search engine, to rank documents based on their relevance to a given search query in a search engine.

More precisely, developer(s) of the present technology have appreciated that search engine operators, such as Google™, Yandex™, Bing™ and Yahoo™, among others, have access to a large amount of user interaction data with respect to search results appearing in response to user queries, which may be used to compare queries and associated search results.

Developer(s) of the present technology have also appreciated that different queries may lead to the same documents, and thus similarity between two queries may be quantified using a closeness of "paths" between search queries that have caused the document to appear in past Search Engine Results Pages (SERPs). Such an approach may, as an example, be used to train a MLA to match a new query with a similar older query, which may be associated with search results that may be of relevance to a user entering the new query on the search engine.

Thus, embodiments of the present technology are directed to a method and a system for ranking search results using a machine learning algorithm.

According to first broad aspect of the present technology, there is provided a computer-implemented method for ranking search results using a first machine learning algorithm (MLA), the method being executed by a server hosting a second MLA, the second MLA having been trained to determine query similarity based on textual content thereof, the method comprising: receiving, by the second MLA, a new query, retrieving, by the second MLA from a search log database, a plurality of search queries having been submitted on a search engine server, computing, by the second MLA, a respective similarity parameter between the new query and each query of the plurality of search queries, selecting, by the second MLA, from the plurality of search queries, a given past query associated with a highest respective similarity parameter, retrieving, by the second MLA, a set of search results associated with the given past query, each respective search result of the set of search results being associated with a respective annotation including: at least one respective search query having been used to access the respective search result on the search engine server, computing, by the second MLA, for each of the at least one respective search query having been used to access the respective search result, a respective second similarity parameter, and using the respective second similarity parameter as a ranking feature by the first MLA for ranking the associated search results as search results for the new query.

In some implementations, the method further comprises: during a training phase: retrieving from the search log database, the plurality of search queries having been submitted on a search engine server, each of the plurality of search queries being associated with the respective set of search results, each respective search result of the respective set of search results being associated with at least one respective user-interaction parameter, computing, for each query of the plurality of search queries, a respective query vector based on the at least one respective user-interaction parameter associated with each search result of the respective set of search results, computing, for each possible pair of queries within the plurality of search queries, based on the respective query vectors of each query of the pair of queries, a respective similarity parameter, the respective similarity parameter being indicative of a degree of similarity between queries in the pair of queries, generating a set of training objects, each training object of the set of training objects including an indication of a respective one of each of the possible pair of queries and the respective similarity parameter, training the second MLA on the set of training objects to determine a similarity parameter of a new pair of queries, at least one query of the new pair of queries not being included in the set of training objects.

In some implementations, the respective annotation further includes: at least one respective user-interaction parameter, the at least one respective user-interaction parameter being indicative of user behavior with the respective search result by at least one user after having submitted the at least one respective query to the search engine server.

In some implementations, during the training phase, the respective similarity parameter is computed by using one of: a scalar multiplication or a cosine similarity.

In some implementations, the respective second similarity parameter is computed by the second MLA based on: a respective similarity parameter between the new query and the at least one respective search query included in the respective annotation, and the at least one respective user-interaction parameter included in the respective annotation.

In some implementations, computing, by the second MLA, for each of the at least one respective search query having been used to access the respective search result, the respective second similarity parameter, comprises: multiplying the respective similarity parameter and the at least one respective user-interaction parameter.

In some implementations, the training the second MLA on the set of training objects to determine the similarity parameter of the new pair of queries is based on at least one respective textual feature of each query of the new pair of queries.

In some implementations, the second MLA is a neural network.

In some implementations, the first MLA is a decision tree based algorithm.

In some implementations, the first MLA uses a plurality of additional features for ranking, and wherein the respective second similarity parameter is added to the plurality of additional features for ranking.

In some implementations, the user-interaction parameter is at least one of: a dwell time and a CTR.

In some implementations, the method further comprises, prior to the receiving of the new query: generating a plurality of annotations including the respective annotations, and storing the plurality of annotations in a storage of the server.

In some implementations, the generating the plurality of annotations is executed by a third trained MLA.

According to second broad aspect of the present technology, there is provided a system for ranking search results using a first machine learning algorithm (MLA), the system executable by a second MLA on the system, the second MLA having been trained to determine query similarity based on textual content thereof, the system comprising: a processor, a non-transitory computer-readable medium comprising instructions, the processor, upon executing the instructions, being configured to: receive, by the second MLA, a new query, retrieve, by the second MLA from a search log database, a plurality of search queries having been submitted on a search engine server, compute, by the second MLA, a respective similarity parameter between the new query and each query of the plurality of search queries, select, by the second MLA, from the plurality of search queries, a given past query associated with a highest respective similarity parameter, retrieve, by the second MLA, a set of search results associated with the given past query, each respective search result of the set of search results being associated with a respective annotation including: at least one respective search query having been used to access the respective search result on the search engine server, compute, by the second MLA, for each of the at least one respective search query having been used to access the respective search result, a respective second similarity parameter, and using the respective second similarity parameter as a ranking feature by the first MLA for ranking the associated search results as search results for the new query.

In some implementations, the processor is further configured to: during a training phase: retrieve from the search log database, the plurality of search queries having been submitted on a search engine server, each of the plurality of search queries being associated with the respective set of search results, each respective search result of the respective set of search results being associated with at least one respective user-interaction parameter, compute, for each query of the plurality of search queries, a respective query vector based on the at least one respective user-interaction parameter associated with each search result of the respective set of search results, compute, for each possible pair of queries within the plurality of search queries, based on the respective query vectors of each query of the pair of queries, a respective similarity parameter, the respective similarity parameter being indicative of a degree of similarity between queries in the pair of queries, generate a set of training objects, each training object of the set of training objects including an indication of a respective one of each of the possible pair of queries and the respective similarity parameter, train the second MLA on the set of training objects to determine a similarity parameter of a new pair of queries, at least one query of the new pair of queries not being included in the set of training objects.

In some implementations, the respective annotation further includes: at least one respective user-interaction parameter, the at least one respective user-interaction parameter being indicative of user behavior with the respective search result by at least one user after having submitted the at least one respective query to the search engine server.

In some implementations, during the training phase, the respective similarity parameter is computed by using one of: a scalar multiplication or a cosine similarity.

In some implementations, the respective second similarity parameter is computed by the second MLA based on: a respective similarity parameter between the new query and the at least one respective search query included in the respective annotation, and the at least one respective user-interaction parameter included in the respective annotation.

In some implementations, to compute, by the second MLA, for each of the at least one respective search query having been used to access the respective search result, the respective second similarity parameter, the processor is configured to: multiply the respective similarity parameter and the at least one respective user-interaction parameter.

In some implementations, the training the second MLA on the set of training objects to determine the similarity parameter of the new pair of queries is based on at least one respective textual feature of each query of the new pair of queries.

In some implementations, the second MLA is a neural network.

In some implementations, the first MLA is a decision tree based algorithm.

In some implementations, the first MLA uses a plurality of additional features for ranking, and wherein the respective second similarity parameter is added to the plurality of additional features for ranking.

In some implementations, the user-interaction parameter is at least one of: a dwell time and a CTR.

In some implementations, the processor is further configured to, prior to the receiving of the new query: generate a plurality of annotations including the respective annotations, and store the plurality of annotations in a storage of the system.

In some implementations, the generating the plurality of annotations is executed by a third trained MLA.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 depicts a schematic diagram of a fourth MLA implemented in accordance with embodiments of the present technology.

DETAILED DESCRIPTION

Figure 1:
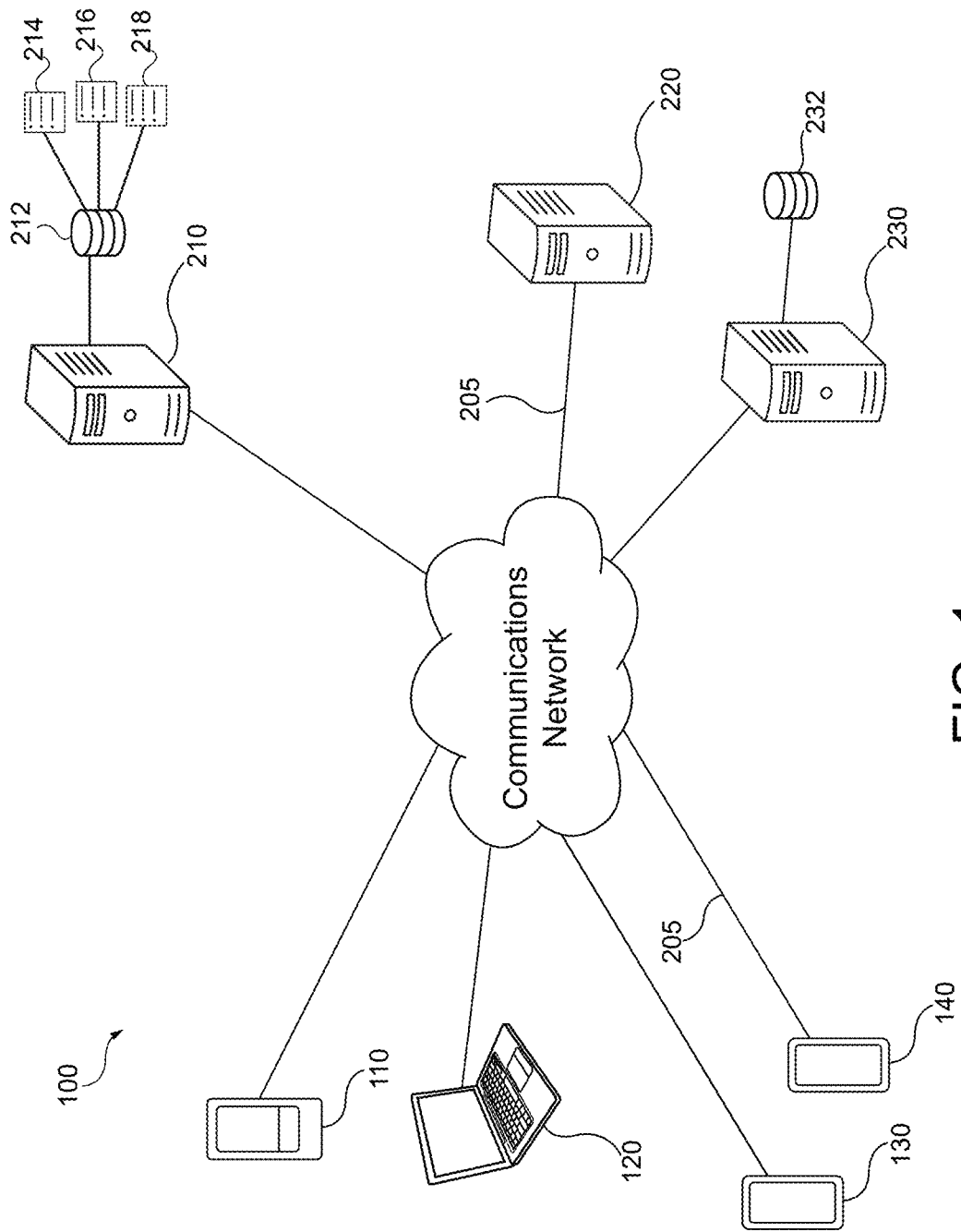
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100, the system 100 implemented according to non-limiting embodiments of the present technology. The system 100 comprises a first client device 110, a second client device 120, a third client device 130, and a fourth client device 140 coupled to a communications network 200 via a respective communication link 205 (only one numbered in FIG. 1). The system 100 comprises a search engine server 210, an analytics server 220 and a training server 230 coupled to the communications network 200 via their respective communication link 205.

As an example only, the first client device 110 may be implemented as a smartphone, the second client device 120 may be implemented as a laptop, the third client device 130 may be implemented as a smartphone and the fourth client device 140 may be implemented as a tablet. In some non-limiting embodiments of the present technology, the communications network 200 can be implemented as the Internet. In other embodiments of the present technology, the communications network 200 can be implemented differently, such as any wide-area communications network, local-area communications network, a private communications network and the like.

How the given communication link 205 is implemented is not particularly limited and will depend on how the associated one of the first client device 110, the second client device 120, the third client device 130 and the fourth client device 140 are implemented. Merely as an example and not as a limitation, in those embodiments of the present technology where at least one of the first client device 110, the second client device 120, the third client device 130 and the fourth client device 140 is implemented as a wireless communication device (such as a smart-phone), the associated one of the communication link 205 can be implemented as a wireless communication link (such as but not limited to, a 3G communications network link, a 4G communications network link, a Wireless Fidelity, or WiFi® for short, Bluetooth® and the like). In those examples, where at least one of the first client device 110, the second client device 120, the third client device 130 and the fourth client device 140 are implemented respectively as laptop, smartphone, tablet computer, the associated communication link 205 can be either wireless (such as the Wireless Fidelity, or WiFi® for short, Bluetooth® or the like) or wired (such as an Ethernet based connection).

It should be expressly understood that implementations for the first client device 110, the second client device 120, the third client device 130, the fourth client device 140, the communication link 205 and the communications network 200 are provided for illustration purposes only. As such, those skilled in the art will easily appreciate other specific implementational details for the first client device 110, the second client device 120, the third client device 130, the fourth client device 140 and the communication link 205 and the communications network 200. As such, by no means, examples provided herein above are meant to limit the scope of the present technology.

While only four client devices 110, 120, 130 and 140 are illustrated (all are shown in FIG. 1), it is contemplated that any number of client devices 110, 120, 130 and 140 could be connected to the system 100. It is further contemplated that in some implementations, the number of client devices 110, 120, 130 and 140 included in the system 100 could number in the tens or hundreds of thousands.

Also coupled to the communications network 200 is the aforementioned search engine server 210. The search engine server 210 can be implemented as a conventional computer server. In an example of an embodiment of the present technology, the search engine server 210 can be implemented as a Dell™ PowerEdge™ Server running the Microsoft™ Windows Server™ operating system. Needless to say, the search engine server 210 can be implemented in any other suitable hardware and/or software and/or firmware or a combination thereof. In the depicted non-limiting embodiment of present technology, search engine server 210 is a single server. In alternative non-limiting embodiments of the present technology, the functionality of the search engine server 210 may be distributed and may be implemented via multiple servers. In some embodiments of the present technology, the search engine server 210 is under control and/or management of a search engine operator. Alternatively, the search engine server 210 can be under control and/or management of a service provider.

Generally speaking, the purpose of the search engine server 210 is to (i) execute searches; (ii) execute analysis of search results and perform ranking of search results; (iii)

group results and compile the search engine result page (SERP) to be outputted to an electronic device (such as one of the first client device 110, the second client device 120, the third client device 130 and the fourth client device 140), the electronic device having been used to submit the search request that resulted in the SERP.

How the search engine server 210 is configured to execute searches is not particularly limited. Those skilled in the art will appreciate several ways and means to execute the search using the search engine server 210 and as such, several structural components of the search engine server 210 will only be described at a high level. The search engine server 210 may maintain a search log database 212.

In some embodiments of the present technology, the search engine server 210 can execute several types of searches, including but not limited to, a general search and a vertical search.

The search engine server 210 is configured to perform general web searches, as is known to those of skill in the art. The search engine server 210 is also configured to execute one or more vertical searches, such as an images vertical search, a music vertical search, a video vertical search, a news vertical search, a maps vertical search and the like. The search engine server 210 is also configured to, as is known to those of skill in the art, execute a crawler algorithm—which algorithm causes the search engine server 210 to "crawl" the Internet and index visited web sites into one or more of the index databases, such as the search log database 212.

The search engine server 210 is configured to generate a ranked search results list, including the results from the general web search and the vertical web search. Multiple algorithms for ranking the search results are known and can be implemented by the search engine server 210.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 210 can thus calculate and assign a relevance score (based on the different criteria listed above) to each search result obtained in response to a user-submitted search query and generate a SERP, where search results are ranked according to their respective relevance scores. In the present embodiment, the search engine server 210 may execute a plurality of machine learning algorithms for ranking documents and/or generate features for ranking documents.

The search engine server 210 typically maintains the above-mentioned search log database 212.

Generally, the search log database 212 may include an index 214, a query log 216, and a user interaction log 218.

The purpose of the index 214 is to index documents, such as, but not limited to, web pages, images, PDFs, Word™ documents, PowerPoint™ documents, that have been crawled (or discovered) by the crawler of the search engine server 210. In some embodiments of the present technology, the index 214 is maintained in a form of posting lists. As such, when a user of one of the first client device 110, the second client device 120, the third client device 130, and the fourth client device 140 inputs a query and performs a search on the search engine server 210, the search engine server 210 analyzes the index 214 and retrieves documents that contain terms of the query, and ranks them according to a ranking algorithm.

The purpose of the query log 216 is to log searches that were made using the search engine server 210. More specifically, the query log 216 maintains terms of search queries (i.e. the associated search words) and the associated search results. It is noted that the query log 216 is maintained in an anonymized manner—i.e. search queries are not trackable to the users who have submitted the search query.

More specifically, the query log 216 may include a list of queries with their respective terms, with information about documents that were listed by the search engine server 210 in response to a respective query, a timestamp, and may also contain a list of users identified by anonymous IDs (or without an ID altogether) and the respective documents they have clicked on after submitting a query. In some embodiments, the query log 216 may be updated every time a new search is performed on the search engine server 210. In other embodiments, the query log 216 may be updated at predetermined times. In some embodiments, there may be a plurality of copies of the query log 216, each corresponding to the query log 216 at different points in time.

The user interaction log 218 may be linked to the query log 216, and list user-interaction parameters as tracked by the analytics server 220 after a user has submitted a query and clicked on one or more documents in a SERP on the search engine server 210. As a non-limiting example, the user interaction log 218 may contain a reference to a document, which may be identified by an ID number or an URL, a list of queries, where each query of the list of queries is associated with a list of documents, and where each document is associated with a plurality of user-interaction parameters (if the document was interacted with), which will be described in more detail herein below. The plurality of user-interaction parameters may generally be tracked and compiled by the analytics server 220, and in some embodiments may be listed for each individual user.

In some embodiments, the query log 216 and the user interaction log 218 may be implemented as a single log.

Also coupled to the communications network 200 is the above-mentioned analytics server 220. The analytics server 220 can be implemented as a conventional computer server. In an example of an embodiment of the present technology, the analytics server 220 can be implemented as a Dell™ PowerEdge™ Server running the Microsoft™ Windows Server™ operating system. Needless to say, the analytics server 220 can be implemented in any other suitable hardware and/or software and/or firmware or a combination thereof. In the depicted non-limiting embodiment of present technology, the analytics server 220 is a single server. In alternative non-limiting embodiments of the present technology, the functionality of the analytics server 220 may be distributed and may be implemented via multiple servers. In other embodiments, the functionality of the analytics server 220 may be performed completely or in part by the search engine server 210. In some embodiments of the present technology, the analytics server 220 is under control and/or management of a search engine operator. Alternatively, the analytics server 220 can be under control and/or management of another service provider.

Generally speaking, the purpose of the analytics server 220 is to track user interactions with search results provided by the search engine server 210 in response to user requests (e.g. made by users of one of the first client device 110, the second client device 120, the third client device 130 and the fourth client device 140). The analytics server 220 may track user interactions (such as, for example, click-through data) when users perform general web searches and vertical web searches on the search engine server 210. The user interactions may be tracked, by the analytics server 220, in a form of user-interaction parameters.

Non-limiting examples of user-interaction parameters tracked by the analytics server 220 include:

Loss/Win: was the document clicked in response to the search query or not.

Dwell time: time a user spends on a document before returning to the SERP.

Long/short click: was the user interaction with the document long or short, compared to the user-interaction with other documents on the SERP.

Click-through rate (CTR): Number of clicks on an element divided by the number of times the element is shown (impressions).

Naturally, the above list is non-exhaustive and may include other types of user-interaction parameters without departing from the scope of the present technology.

The analytics server 220 may transmit the tracked user-interaction parameters to the search engine server 210 such that it can be stored in the user interaction log 218. In some embodiments, the analytics server 220 may store the user-interaction parameters and associated search results locally in an user interaction log (not depicted). In alternative non-limiting embodiments of the present technology, the functionality of the analytics server 220 and the search engine server 210 can be implemented by a single server.

Also coupled to the communications network is the above-mentioned training server 230. The training server 230 can be implemented as a conventional computer server. In an example of an embodiment of the present technology, the training server 230 can be implemented as a Dell™ PowerEdge™ Server running the Microsoft™ Windows Server™ operating system. Needless to say, the training server 230 can be implemented in any other suitable hardware and/or software and/or firmware or a combination thereof. In the depicted non-limiting embodiment of present technology, the training server 230 is a single server. In alternative non-limiting embodiments of the present technology, the functionality of the training server 230 may be distributed and may be implemented via multiple servers. In the context of the present technology, the training server 230 may implement in part the methods and system described herein. In some embodiments of the present technology, the training server 230 is under control and/or management of a search engine operator. Alternatively, the training server 230 can be under control and/or management of another service provider.

Generally speaking, the purpose of the training server 230 is to train one or more machine learning algorithms (MLAs) used by the search engine server 210, the analytics server 220 and/or other servers (not depicted) associated with the search engine operator. The training server 230 may, as an example, train one or more MLAs associated with the search engine provider for optimizing general web searches, vertical web searches, providing recommendations, predicting outcomes, and other applications. The training and optimization of the MLAs may be executed at predetermined periods of time, or when deemed necessary by the search engine provider.

The training server 230 may maintain a training database 232 for storing training objects and/or features for the different MLAs used by the search engine server 210, the analytics server 220 and/or other servers (not depicted) associated with the search engine operator.

In the embodiments illustrated herein, the training server 230 may be configured to train (1) a first MLA for ranking documents on the search engine server 210, (2) a second MLA for generating features that may be used by the first MLA, (3) a third MLA for generating annotations for documents, which may be used by at least one of the first MLA, the second MLA and fourth MLA, and (4) a fourth MLA for comparing queries and generating similarity parameters, which may be used by at least one of the first MLA and the second MLA. The first MLA, the second MLA, the third MLA and the fourth MLA will be described in more detail in the following paragraphs. While the description refers to general web searches for documents such as web pages, the present technology may also be applied at least partially to vertical searches and to other types of documents, such as image results, videos, music, news, and other types of searches. It is noted that all or some of the first MLA, the second MLA, the third MLA and the fourth MLA may be implemented in a single MLA.

Figure 2:
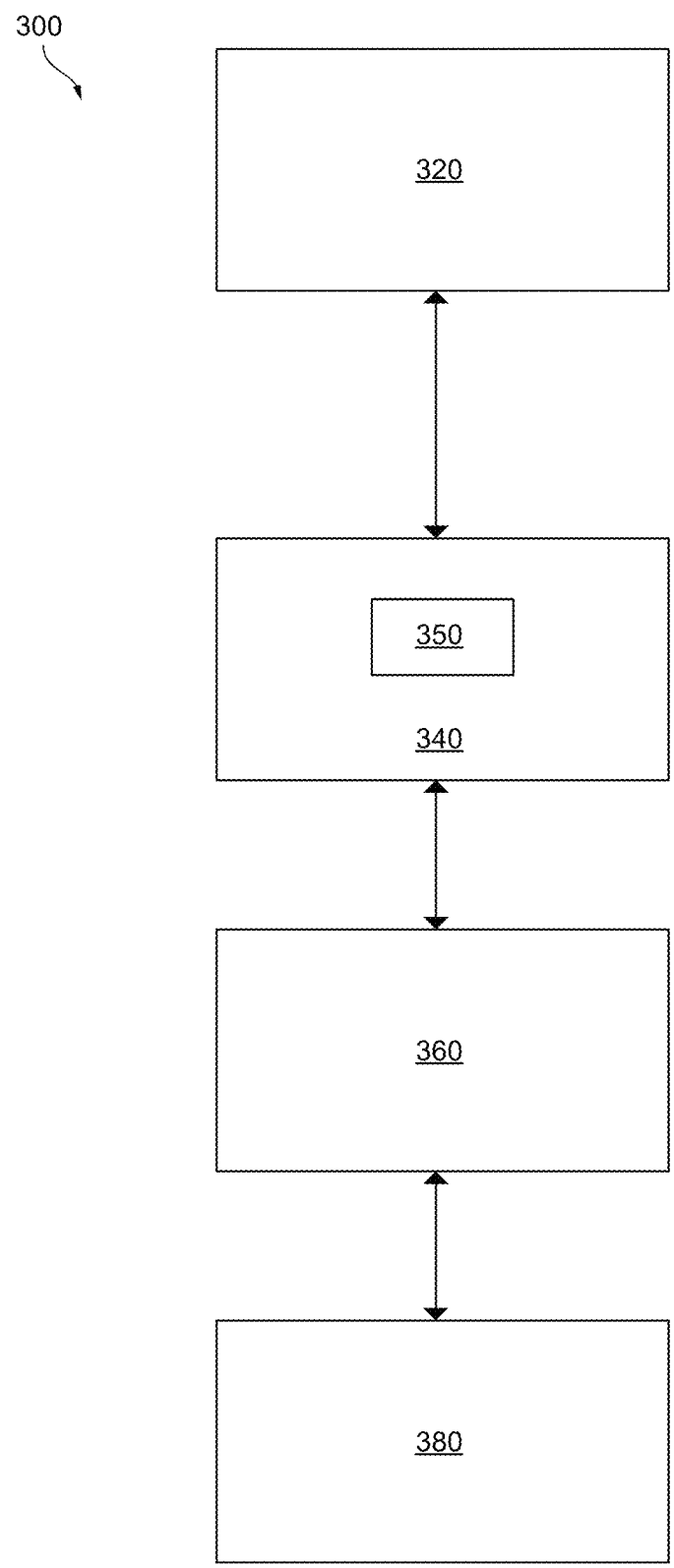
FIG. 2 depicts a schematic diagram of machine learning system implemented in accordance with embodiments of the present technology.

Now turning to FIG. 2, a machine learning system 300 is illustrated in accordance with non-limiting embodiments of the present technology. The machine learning system 300 includes a first MLA 320, a second MLA 340, a third MLA 360 and a fourth MLA 380.

The first MLA 320 may generally be configured to rank search results on the search engine server 210 and may implement a gradient boosted decision tree algorithm (GBRT). Briefly speaking, GBRT is based on decision trees, whereby a prediction model in the form of an ensemble of trees is generated. The ensemble of trees is built in a stage-wise manner Each subsequent decision tree in the ensemble of decision trees focuses training on those previous decision tree iterations that were "weak learners" in the previous iteration(s) of the decision trees ensemble (i.e. those that are associated with poor prediction/high error). Boosting is a method aimed at enhancing prediction quality of an MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the first MLA 320 first builds a first tree, then a second tree, which enhances the prediction outcome of the first tree, then a third tree, which enhances the prediction outcome of the first two trees and so on. Thus, the first MLA 320 in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

The first MLA 320 may thus be used for classification and/or regression and/or ranking by the search engine server 210. The first MLA 320 may be the main ranking algorithm of the search engine server 210, or may be part of the ranking algorithm of the search engine server 210.

The second MLA 340 may execute a modified deep structured semantic model (DSSM) 350. Generally, the purpose of the second MLA 340 is to enrich document features such that the features may be used by the first MLA 320 for ranking documents based on a relevance score. The second MLA 340 is configured to train the modified DSSM 350 on at least a search query and a title of a document. The modified DSSM 350 generally receives as an input word unigrams (entire words), word bigrams (pairs of words) and word trigrams (sequences of three words). In some embodiments, the modified DSSM 350 may also receive as an input word n-grams, where n is greater than 3. The modified DSSM 350 is also trained on user-interaction parameters, such as, but not limited to: click/no-click which may be weighted by dwell time or log(dwell time), depth of the click, click abandonment, number of unique clicks per session, CTR, etc. The output of the second MLA 340 may be used as an input by the first MLA 320.

The third MLA 360 is configured to generate annotation for documents, which may be used as by at least one of the first MLA 320, the second MLA 340 and the fourth MLA 380. In the present embodiment, the annotations may be used for training at least one of the first MLA 320, the second MLA 340, and the fourth MLA 380 or may be directly used as features by at least one of the first MLA 320 and the fourth MLA 380. The third MLA 360 may generate annotations in the form of annotation vectors that may be used by the modified DSSM 350 of the second MLA 340 and the fourth MLA 380, as an example, for matching queries and documents, for comparing queries and documents, and for making predictions on user interactions with a given document.

An annotation vector associated with a document may generally include: a respective search query having been used to access the respective document on the search engine server 210 and at least one respective user-interaction parameter (indicative of the user interaction with the document in response to a search query). In some embodiments, an annotation vector may further include a plurality of query features of the respective search query, the plurality of query features being at least partially indicative of linguistic features of the respective search query. The linguistic features may include semantic features of the query, grammatical features of the query, and lexical features of the query. As such a document may be associated with one or more annotation vectors.

The fourth MLA 380 may be generally configured to compare search queries part of a pair of search queries, and to generate similarity parameters that are indicative of a similarity level between the queries of the pair. The fourth MLA 380, once trained, may also be configured to determine a past query that is similar to a currently submitted query, based on at least a similarity analysis of the past query and the currently submitted query.

The fourth MLA 380 may be trained on a set of training objects to learn relationships between queries of a pair and a similarity parameter, which has been generated based on similar search results obtained in response to the queries and the associated user-interaction parameters. As a non-limiting example, the fourth MLA 380 may use textual content and features of the queries that are part of the pair to establish the relationship between the queries and the similarity parameter. Once trained, the fourth MLA 380 may then be able to select a similar query when presented with a new and unseen query, and predict a similarity parameter, which may be used as a feature by the first MLA 320 and/or the second MLA 340. In the embodiments illustrated herein, the fourth MLA 380 may be implemented as a neural network. In some embodiments, the third MLA 360 and the fourth MLA 380 may be implemented as a single MLA.

How the fourth MLA 380 is trained and used will now be described in more detail with reference to FIGS. 3 to 7.

Figure 3:
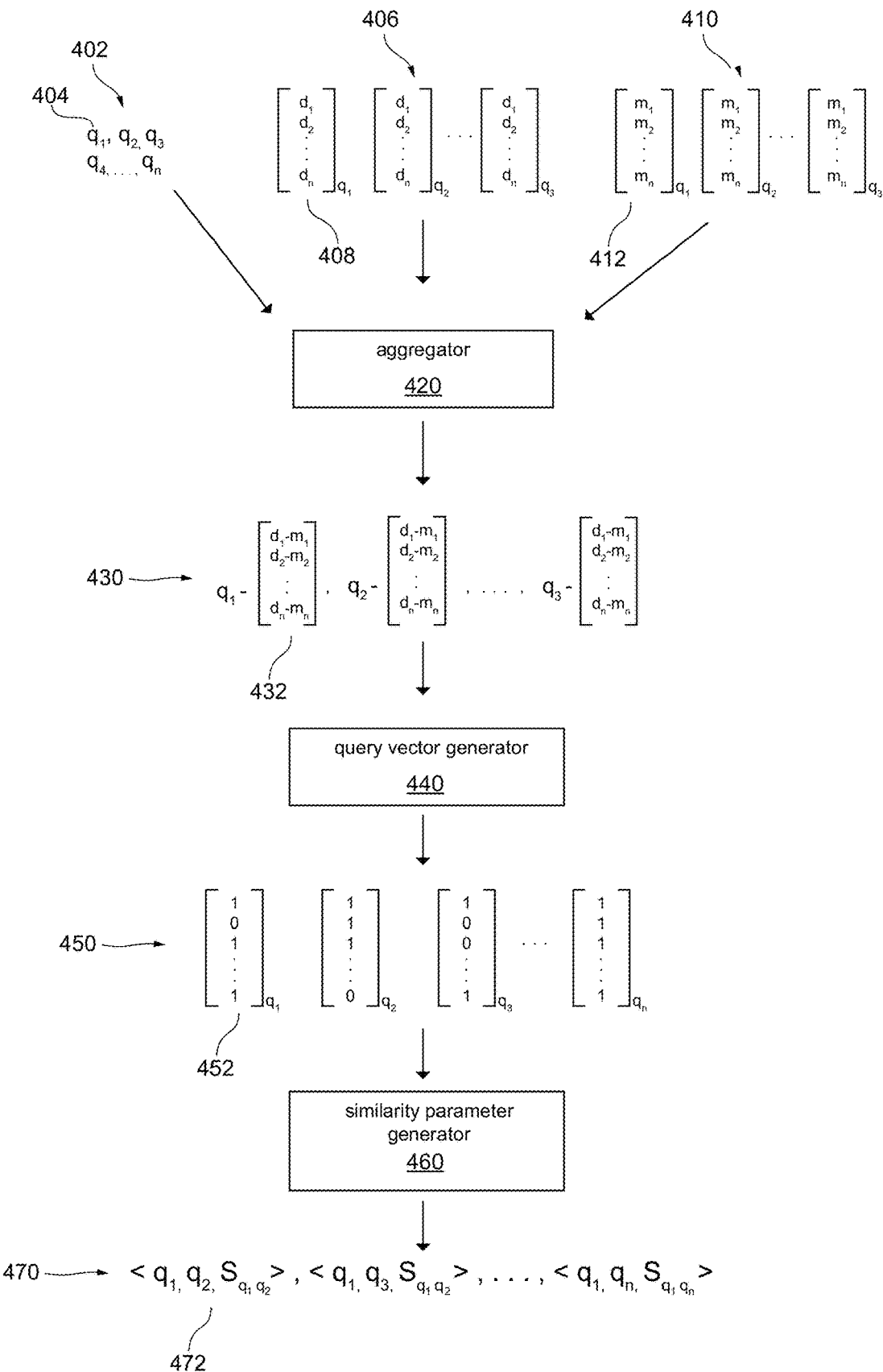
FIG. 3 depicts a schematic diagram of a training set generation routine implemented in accordance with embodiments of the present technology.

Now turning to FIG. 3, a schematic diagram of a training set generation routine 400 is illustrated in accordance with non-limiting embodiments of the present technology. The training set generation routine 400 may be executed by the training server 230. The purpose of the training set generation routine 400 is to generate a set of training objects which may be used to train the fourth MLA 380.

The training set generation routine 400 includes an aggregator 420, a query vector generator 440, and a similarity parameter generator 460.

The aggregator 420 may generally be configured to retrieve, aggregate, filter and associate together queries, documents and user-interaction parameters.

The aggregator 420 may retrieve, from the query log 216 of the search log database 212 of the search engine server 210, an indication of a plurality of search queries 402. The indication of the plurality of search queries 402 may include a predetermined number of search queries. In some embodiments, each search query 404 in the indication of the plurality of search queries 402 may be a reference to the search query, a numerical representation of the search query, or the actual search query. In other embodiments, each search query 404 in the indication of the plurality of search queries 402 may be a vector including the search query and features of the search query. The number of search queries 404 in the indication of the plurality of search queries 402 is not limited, and depends on how the fourth MLA 380 is implemented. As a non-limiting example, the indication of the plurality of the search queries 402 may include the 10,000 most popular search queries submitted on the search engine server 210.

In some embodiments, the search queries 404 in the indication of the plurality of search queries 402 may be chosen based on specific criteria, such as, but not limited to:
popularity of the queries on the search engine server 210, linguistic features of the search queries 404, respective search results associated with the search queries 404, etc. In alternative embodiments, the search queries 404 in the indication of the plurality of search queries 402 may be chosen randomly.

The aggregator 420 may retrieve, from the query log 216 of the search log database 212 of the search engine server 210, an indication of a plurality of search results 406, the indication of the plurality of search results 406 including a respective set of search results 408 associated respectively with each search query 404 of the indication of the plurality of search queries 402. The number of search results in the respective set of search results 408 may be predetermined, e.g. the respective set of search results 408 may only include the top 100 search results obtained in response to the respective search query 404.

The aggregator 420 may retrieve, from the user interaction log 218 of the search log database 212 of the search engine server 210, an indication of a plurality of user-interaction parameters 410. The indication of the plurality of user-interaction parameters 410 includes a plurality of respective sets of user-interaction parameters 412, each respective set of user-interaction parameters 412 corresponding to a respective set of search results 408, where a given search result of the respective set of search results 408 is associated with one or more user-interaction parameters of the respective set of user-interaction parameters 412. Generally, each user-interaction parameter of each of the respective set of user-interaction parameters 412 may be indicative of user behavior of one or more users after having submitted the respective search query 404 on the search engine server 210, and clicked on one or more search results in the respective set of search results 408 during a search session on the search engine server 210, as an example via one of the first client device 110, the second client device 120, the third client device 130, and the fourth client device 140.

In some embodiments, depending on how the fourth MLA 380 is implemented, the aggregator 420 may retrieve one or more specific user-interaction parameters that are relevant to the task at hand, and may not necessarily retrieve all user-interaction parameters tracked by the analytics server 220 and stored in the user interaction log 218 of the search log database 212. As a non-limiting example, in the illustrated embodiment, the aggregator 420 may retrieve a respective dwell time for each search result of the respective set of search results 408.

Generally, the user-interaction parameters may be an aggregate of user-interaction parameters from a plurality of users, and may not be individual user-interaction parameters. In some embodiments, at least one of the first MLA 320, the second MLA 340, the third MLA 360 and the fourth MLA 380 may be configured for personalized searches, and the aggregator 420 may aggregate user-interaction parameters for a single user.

The aggregator 420 may then associate each of the respective search queries 404 with the respective set of search results 408 and the respective set of user-interaction parameters 412 and output a set of associated results and user-interaction parameters 430. The set of associated results and user-interaction parameters 430 includes a plurality of vectors of associated results and user-interaction parameters 432. In some embodiments, the each of the respective search queries 404 with the respective set of search results 408 and the respective set of user-interaction parameters 412 may already be associated together in the form of the set of associated results and user-interaction parameters 430 in a log of the search log database 212 of the search engine server.

The query vector generator 440 may receive as an input the set of associated results and user-interaction parameters 430 to output a plurality of query vectors 450, each query vector 452 of the plurality of query vectors 450 corresponding to each of the set of associated results and user-interaction parameters 430.

Generally, the purpose of the query vector generator 440 is to generate a respective query vector 452 for each of the associated respective set of search results 408 and user-interaction parameters 430 obtained in response to a respective search query 404.

The manner in which each respective query vector 452 is represented is not limited, and generally the purpose of a respective query vector 452 is to include information about search results and user-interaction parameters obtained in response to a query in a vector such that it can be compared with another respective vector, and that a similarity between two query vectors may be assessed.

In the present embodiment, each row or column of the respective query vector 452 associated with the respective search query 404 may correspond to a respective search result of the respective set of search results 408, and each element may correspond to a presence of a user-interaction parameter of the respective set of user-interaction parameters 412, e.g. an element may be equal to 1 if there is a user-interaction parameter or if the user-interaction parameter is over a predetermined threshold, and 0 if there is no user-interaction parameter or if the user-interaction is under the predetermined threshold. As an example, if there is a presence of dwell time for a respective search result, the element may be equal to 1, and if there is no presence of dwell time the element may be equal to 0. In alternative embodiments, each respective query vector 452 may include a value of each user-interaction parameter.

In some embodiments, when more than one user-interaction parameter is considered for a search result, each respective query vector 452 may be a matrix or, or there may be more than one respective query vector 452 per respective search query 404 (each corresponding to a different user-interaction parameter), which may be associated with each of the respective set of associated results and user-interaction parameters 432.

The query vector generator 440 may then output a plurality of query vectors 450.

The similarity parameter generator 460 may receive as an input the plurality of query vectors 450 to output a set of similarity tuples 470, each tuple 472 in the set of similarity tuples 370 including the pair of queries and a respective similarity parameter being indicative of a similarity level between the two queries in the pair of queries.

Generally, the purpose of the similarity parameter generator 460 is to compute, for each possible pair of queries within the indication of the plurality of search queries 402, a respective similarity parameter. The respective similarity parameter is indicative of a similarity level between the queries included in the pair of queries, based on (i) similar search result obtained in response to the queries of the pair and, (ii) user interactions with the respective similar search results.

As a non-limiting example, in the present embodiment, each respective similarity parameter for a respective pair of queries may be obtained by performing a scalar multiplication of the respective query vectors associated with the respective queries of the pair. As such, the respective similarity parameter may be directly indicative of the similarity between the queries, e.g. a similarity parameter of 10 may indicate that the two search queries have at least 10 similar results, and that 10 similar results have a presence of a user-interaction parameter, such as dwell time. In some embodiments, the respective similarity parameter may be relative, e.g. if there are 10 similar results that have a dwell time on a total of 20 results, the similarity parameter may be 10/20=0.5 or 50%. In some embodiments, the similarity parameter may be weighted based on different criteria.

In embodiments where more than one user-interaction parameter may be associated with each search result, there may be more than one respective similarity parameter in a tuple 472 for each pair (each corresponding to a different user-interaction parameter), or the respective similarity parameter in a tuple 472 may be a single number which includes information about the one or more user-interaction parameters.

In alternative embodiments, other methods known in the art may be used to quantify similarity between queries, such as, but not limited to, cosine similarity, bipartite graphs, and Pearson correlation coefficient.

The similarity parameter generator 460 may then output the set of similarity tuples 470. The set of similarity tuples 470 includes a tuple 472 for each possible pair of search queries, each tuple 472 being in the form $<q_i, q_j, S_{ij}>$, the tuple 472 including an indication of a first query $q_i$ of the pair, an indication of a second query $q_j$ of the pair, and the similarity parameter $S_{ij}$ between the first query $q_i$ and second query $q_j$. Thus, the respective similarity parameter may be a label for a respective pair of search queries.

The set of similarity tuples 470 may be stored in the training database 232 of the training server 230. As a non-limiting example, each respective tuple 472 may be saved as a training object of a set of training objects (not depicted) in the training database 232 of the training server 230.

Now turning to FIG. 4, a schematic diagram of training routine 500 of the fourth MLA 380 is illustrated in accordance with non-limiting embodiments of the present technology.

In the illustrated non-limiting embodiment, the fourth MLA 380 is a neural network having an input layer 510, a plurality of hidden layers 520 and an output layer 530.

The fourth MLA 380 may receive as an input the set of similarity tuples 470.

Generally, as explained previously, the purpose of the fourth MLA 380 is to learn, from the provided set of similarity tuples 470, where each tuple 472 includes a queries of a pairs of queries and an associated similarity parameters, to recognize queries that may be similar without having previously seen (i.e. given as a training example) at least one query of the pair, and to compute similarity parameters.

The input layer 510 may receive as an input the tuples 472 of the set of similarity tuples 470. In some embodiments, each tuple 472 of the set of similarity tuples 470 may be divided into a plurality of inputs: a first query, a second query, a pair of queries including the first and second query, and the similarity parameter between the first query and the second query. Generally, the similarity parameter may be the label associated with the pair of queries.

The fourth MLA 380 may be configured to examine a plurality of features of each query during the training phase. The fourth MLA 380 may consider, as a non-limiting example, semantic features of the query, grammatical features of the query, and lexical features of the query. The fourth MLA 380 may either generate the features or retrieve the features from a feature database (not depicted).

As another non-limiting example, the fourth MLA 380 may use word2vec and bag-of-words models to analyze occurrences of queries of a pair of queries in different documents, and build its model based on the occurrence of the queries and the similarity parameter.

The fourth MLA 380 may thus build a model by making weighted connection of the neurons in the plurality of hidden layers 520, which may be used to compute a similarity parameter between two queries.

Figure 5:
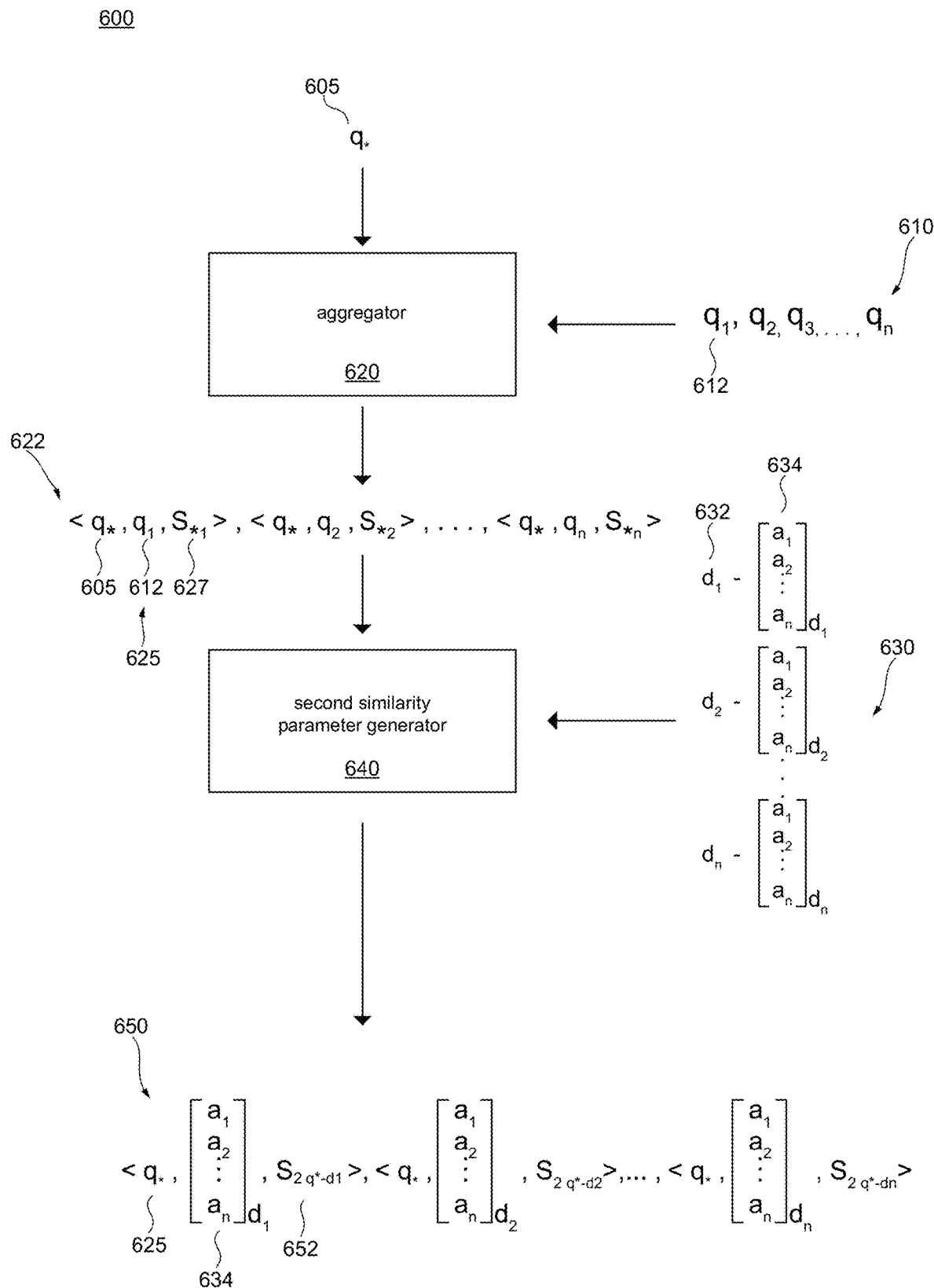
FIG. 5 depicts a schematic diagram of an in-use routine of the fourth MLA of FIG. 4 in implemented accordance with embodiments of the present technology.

Now turning to FIG. 5, a schematic diagram of a in-use phase 600 executed by the fourth MLA 380 of the training server 230 is illustrated in accordance with non-limiting embodiments of the present technology.

The in-use phase 600 executed by the fourth MLA 380 includes a first aggregator 620, and a second similarity parameter generator 640.

The first aggregator 620 may generally be configured to receive a new query and to retrieve a plurality of queries 610.

The new query 605 is generally a query that the fourth MLA 380 (or other MLAs) may not have previously seen, i.e. the fourth MLA 380 has not been previously trained on the new query 605. In some embodiments, the fourth MLA 380 may have seen terms of the new query 605. The fourth MLA 380 may also be configured to compute and/or retrieve features of the new query 605.

The first aggregator 620 of the fourth MLA 380 may retrieve the plurality of past queries 610 from the query log 216 of the search log database 212 of the search engine server 210. Generally, the plurality of past queries 610 may have been previously seen by the fourth MLA 380, during a training phase or previous in-use phase.

The fourth MLA 380 may compute a respective similarity parameter 627 between each past query 612 of the plurality of past queries 610 and the new query 605. The first aggregator 620 may output a set of similarity tuples 622, the set of similarity tuples 622 including a respective tuple 625 for each pair of queries, the tuple 625 including (1) the new query 605, (2) the respective past query 612, and (3) the respective similarity parameter between the new query 605 and the respective past query 612.

The second similarity parameter generator 640 of the fourth MLA 380 may receive as an input the set of similarity tuples 622 and select a tuple 625 associated with a past query (not depicted) having a highest similarity parameter, the highest similarity parameter indicating that it is the past query that is deemed to be the closest to the new query 605, as seen by the fourth MLA 380.

The second similarity parameter generator 640 of the fourth MLA 380 may retrieve a set of search results 630 associated with the given past query having the highest similarity parameter. The number of search results in the set of search results 630 may be predetermined, such as the top 100 search results obtained in response to the given past query having the highest similarity parameter. Each respective search result 632 of the set of search results 630 may be associated with one or more respective annotation vectors 634, which have been previously generated by the third MLA 360. Each respective annotation vector 634 may generally include: a respective search query having been used to access the respective search result 632 on the search engine server 210 and at least one respective user-interaction parameter. In some embodiments, the respective annotation vector 634 may further include a plurality of query features of the respective search query, the plurality of query features being at least partially indicative of linguistic features of the respective search query 404. The linguistic features may include semantic features of the query, grammatical features of the query, and lexical features of the query.

The second similarity parameter generator 640 of the fourth MLA 380 may then compute a respective second similarity parameter 652 for each annotation vector 634 associated with the respective search result 632 of the set of search results 630, and output a set The respective second similarity parameter 652 may be computed based on (1) the at least one respective user-interaction parameter included in the respective annotation vector 634, and (2) a respective similarity parameter computed between the new query 605 and the respective annotation vector 634, which includes the respective query having been used to access the respective search result 632 associated with the respective annotation vector 634. In some embodiments, the respective second similarity parameter 652 may be computed by multiplying the at least one user-interaction parameter with the respective similarity parameter between the new query 605 and the respective query included in the respective annotation vector 634. In embodiments where there may be more than one respective annotation vector 634 per respective search result 632, a second respective similarity parameter 652 may be computed for each of the plurality of annotation vectors 634, and the second respective similarity parameters 652 may be, as an example, averaged, or a highest one of the second respective similarity parameters 652 may be selected for a respective search result 632.

The respective second similarity parameter 652 may thus be a parameter linking the new query 605 and the respective search result 632 associated with the past query being the most similar to the new query 605, and may be indicative of a level of proximity between the new query 605 and each respective search result 632 of the set of search results 630 associated with the past query. The respective second similarity parameter 652 for the respective search result 632 may also be interpreted as a predicted user-interaction parameter, which is weighted by the similarity parameter between the new query 605 and the respective query included in the respective annotation vector 634.

The second similarity parameter generator 640 of the fourth MLA 380 may then output a set of ranking features 650, the set of ranking features 650 including some or all of: a plurality of tuples, the tuples including an indication of the new query 605, the respective search result 632 and/or respective annotation vector 634, and the respective second similarity parameter 652.

As such, the set of ranking features 650 may be associated, as an example in the training database 232, with the new query 605. The set of ranking features 650 may be used by the first MLA 320 as features to rank search results (including the set of search results 630) when receiving the new query 605.

In some embodiments, the new query 605 may only be associated with search results having a respective second similarity parameter 652 over a predetermined threshold.

Figure 6:
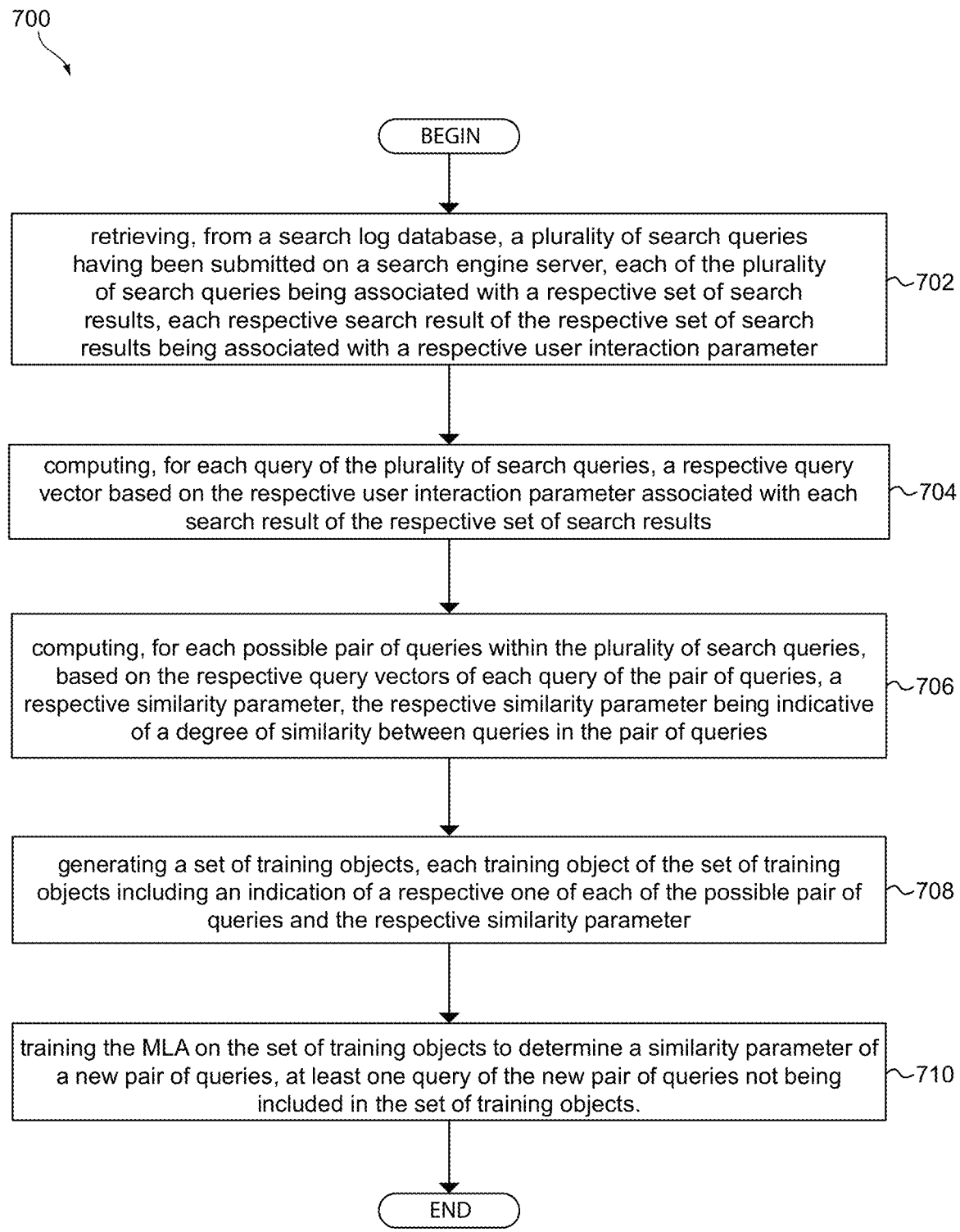
FIG. 6 depicts a block diagram of a method for generating a set of training objects and training the fourth MLA, the method executable within the system of FIG. 1 in accordance with embodiments of the present technology.

Now turning to FIG. 6, a flowchart of a method 700 of generating a set of training objects and training the fourth MLA 380 is illustrated. The method 700 is executed by the training server 230.

The method 700 may begin at step 702.

STEP 702: retrieving, from a search log database, a plurality of search queries having been submitted on a search engine server, each of the plurality of search queries being associated with a respective set of search results, each respective search result of the respective set of search results being associated with a respective user-interaction parameter At step 702, the aggregator 420 of the training server 230, may retrieve, from the query log 216 of the search log database 212, an indication of a plurality of search queries 402 having been submitted on a search engine server 210. The aggregator 420, may retrieve, from the query log 216 of the search log database 212, an indication of a plurality of search results 406, the indication of the plurality of search results 406 including a respective set of search results 408 for each search query 404 of the indication of the plurality of search queries 402. The aggregator 420 may also retrieve, from the user interaction log 218 of the search log database 212, an indication of a plurality of user-interaction parameters 410, the indication of the plurality of user-interaction parameters 410 including a respective set of user-interaction parameters 412 for each of the respective set of search results 408. The respective set of user-interaction parameters 412 may include one or more respective user-interaction parameters for a respective search result in the respective set of search results 408 associated with respective search query 404. The aggregator 420 may associate each of the respective search queries 404 with the respective set of search results 408 and the respective set of user-interaction parameters 412 and output a respective set of associated results and user-interaction parameters 430. In some embodiments, each of the respective search queries 404, the respective set of search results 408 and the respective set of user-interaction parameters 412 may already be associated together in the search log database 212, and the aggregator 420 may directly retrieve the respective set of associated results and user-interaction parameters 432 for each search query 404 from the search log database 212.

The method 700 may then advance to step 704.

STEP 704: computing, for each query of the plurality of search queries, a respective query vector based on the respective user-interaction parameter associated with each search result of the respective set of search results At step 704, the query vector generator 440 may compute, for each search query 404 in the indication of the plurality of search queries 402, a respective query vector 452 based on the one or more respective user-interaction parameters of the set of user-interaction parameters 412 associated with each search result of the respective set of search results 408. Each query vector 452 may be indicative of a presence of one or more user-interaction parameters with respect to search results of the respective set of search results 408 obtained in response to the respective search query 404. The query vector generator 440 may output a plurality of query vectors 450.

The method 700 may then advance to step 706.

STEP 706: computing, for each possible pair of queries within the plurality of search queries, based on the respective query vectors of each query of the pair of queries, a respective similarity parameter, the respective similarity parameter being indicative of a degree of similarity between queries in the pair of queries At step 706, the similarity parameter generator 460 may compute, for each possible pair of queries within the indication of the plurality of search queries 402, based on the respective query vectors 452 of each search query 404 of the pair of queries, a respective similarity parameter, the respective similarity parameter being indicative of a degree of similarity between queries 404 in the pair of queries. In some embodiment, the respective similarity parameter may be computed by doing a scalar multiplication of the respective query vectors 452 of associated with each query of the pair of queries.

The method 700 may then advance to step 708.

STEP 708: generating a set of training objects, each training object of the set of training objects including an indication of a respective one of each of the possible pair of queries and the respective similarity parameter At step 708, the similarity parameter generator 460 may generate a set of similarity tuples 470, each tuple 472 of the set of similarity tuples 470 including an indication of a respective one of each of the possible pair of queries and the respective similarity parameter. The set of similarity tuples 470 may be stored as a set of training objects in the training database 232 of the training server 230.

The method 700 may then advance to step 710.

STEP 710: training the MLA on the set of training objects to determine a similarity parameter of a new pair of queries, at least one query of the new pair of queries not being included in the set of training objects.

At step 710, the fourth MLA 380 may be trained on the set of set of similarity tuples 470 to determine a similarity parameter of a new pair of queries, at least one query of the new pair of queries not being included in the set of training objects.

The method 700 may then end.

Figure 7:
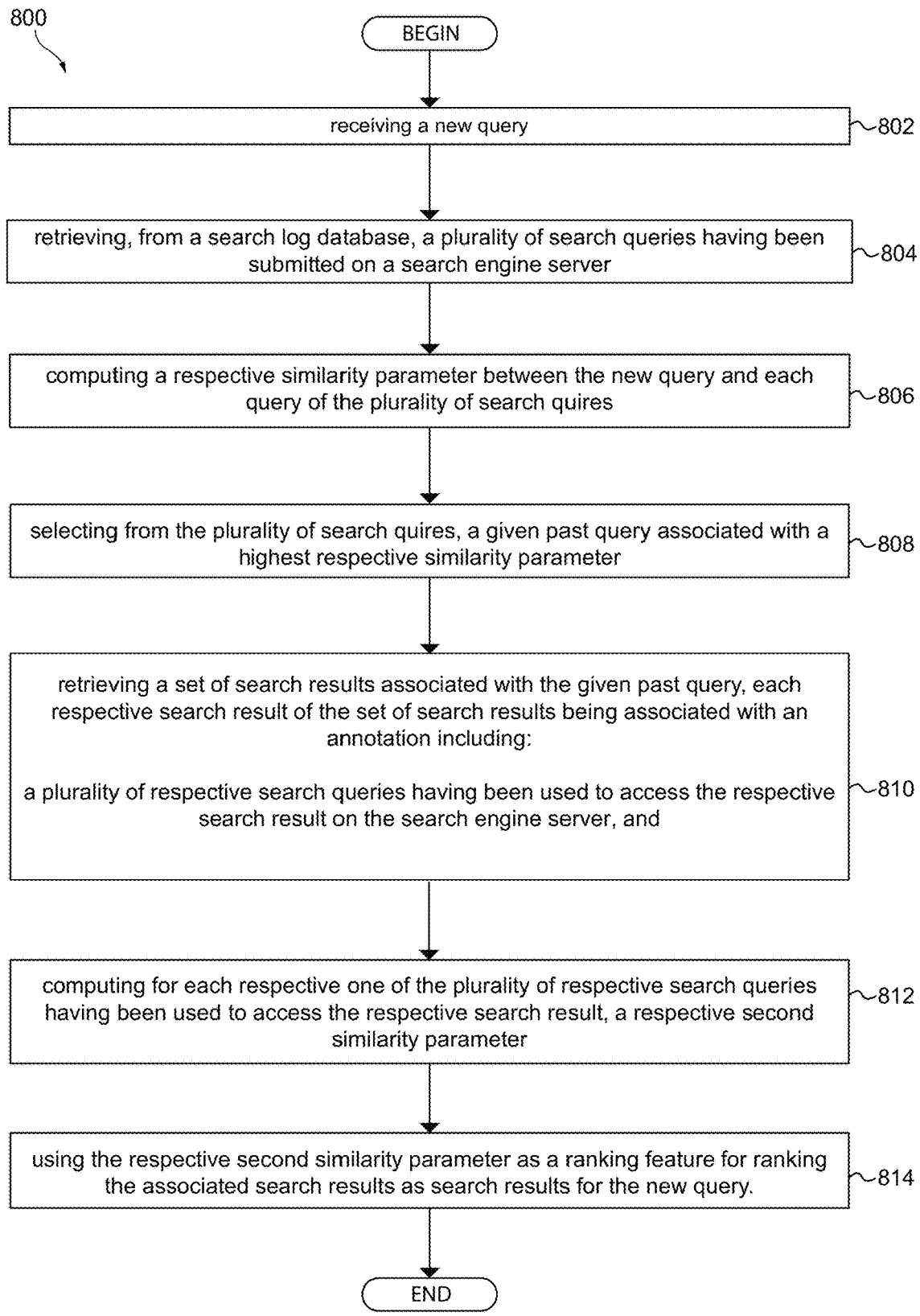
FIG. 7 depicts a block diagram of a method for ranking search results using a first MLA, the method executable within the system of FIG. 1 in accordance with embodiments of the present technology.

Now turning to FIG. 7, a flowchart of a method 800 for ranking search results using the first MLA 320 is illustrated in accordance with non-limiting embodiments of the present technology. The method 800 may be executed by the first MLA 320 and the fourth MLA 380 of the training server 230.

The method 800 may begin at step 802.

STEP 802: receiving a new query

At step 802, the fourth MLA 380 may receive a new query 605, the new query 605 being a query that has not been previously seen by the fourth MLA 380.

The method 800 may then advance to step 804.

STEP 804: retrieving, from a search log database, a plurality of search queries having been submitted on a search engine server At step 804, the fourth MLA 380 may retrieve, from the search log database 212 of the search engine server 210, a plurality of queries 610 having been submitted on a search engine server 210.

The method 800 may then advance to step 806.

STEP 806: computing a respective similarity parameter between the new query and each query of the plurality of search queries At step 806, the fourth MLA 380 may compute a respective similarity parameter 627 between the new query 605 and each past query 612 of the plurality of past queries 610. The respective similarity parameter 627 may be based on textual features of each one of the new query and each past query 612 of the plurality of past queries 610. The fourth MLA 380 may output a set of similarity tuples 622, each tuple 625 including the new query 605, the respective past query 612 and the respective similarity parameter 627.

The method 800 may then advance to step 808.

STEP 808: selecting from the plurality of search quires, a given past query associated with a highest respective similarity parameter At step 808, the fourth MLA 380 may select from the set of similarity tuples 622, a tuple 625 associated with a given past query 612 having a highest respective similarity parameter 627.

The method 800 may then advance to step 810.

STEP 810: retrieving a set of search results associated with the given past query, each respective search result of the set of search results being associated with an annotation including:
  a plurality of respective search queries having been used to access the respective search result on the search engine server At step 810, the fourth MLA 380 may retrieve a set of search results 630 associated with the given past query having the highest similarity parameter, each respective search result 632 of the set of search results 630 being associated with a respective annotation vector 634, the respective annotation vector 634 including a plurality of respective search queries having been used to access the respective search result on the search engine server 210, and at least one respective user-interaction parameter, the at least one respective user-interaction parameter being indicative of user behavior with the respective search result 632 by at least one user after having submitted the at least one respective query to the search engine server. In some embodiments, the respective annotation vector 634 may further include a plurality of query features of the respective search query in the respective annotation vector 634, the plurality of query features being at least partially indicative of linguistic features of the respective query.

The method 800 may then advance to step 812.

STEP 812: computing for each respective one of the plurality of respective search queries having been used to access the respective search result, a respective second similarity parameter At step 812, the fourth MLA 380 may compute for each respective one of the plurality of respective search queries having been used to access the respective search result 632, a respective second similarity parameter 652. The respective second similarity parameter 652 may be computed based on (1) the at least one respective user-interaction parameter included in the respective annotation vector 634, and (2) a respective similarity parameter computed between the new query 605 and the respective query having been used to access the respective search result 632 associated with the respective annotation vector 634. In some embodiments, the respective second similarity parameter 652 may be computed by multiplying the at least one user-interaction parameter with the respective similarity parameter between the new query 605 and the respective query included in the respective annotation vector 634.

The method 800 may then advance to step 814.

STEP 814: using the respective second similarity parameter as a ranking feature for ranking the associated search results as search results for the new query.

At step 814, the fourth MLA 380 may use the respective second similarity parameter 652 as a ranking feature for ranking the associated search results 630 as search results for the new query 605.

The method 800 may then end.

The present technology may allow for more efficient processing in information retrieval applications, which may allow saving computational resources and time on both client devices and server by presenting more relevant results to users in response to queries.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for ranking search results using a first machine learning algorithm (MLA), the method being executed by a server hosting a second MLA, the second MLA having been trained to determine query similarity, the method comprising:
  receiving, by the second MLA, a new query;
  retrieving, by the second MLA from a search log database, a plurality of search queries having been submitted on a search engine server;
  computing, by the second MLA, a first similarity parameter between the new query and each query of the plurality of search queries, the first similarity parameter being determined based on one or more textual features of the new query and each query of the plurality of search queries;

selecting, by the second MLA, from the plurality of search queries, a first past query associated with a highest first similarity parameter;

retrieving, by the second MLA, a set of search results associated with the first past query, the set of search results including a first search result associated with:
  a first annotation including:
    a second past query having been used to access the first search result on the search engine server, the second past query being different from the new query and the first past query;
    a first user-interaction parameter indicative of user behavior with the first search result in response to the second past query having been used to access the first search result on the search engine server;
  a second annotation including:
    a third past query having been used to access the first search result on the search engine server, the third past query being different from the new query, the first past query and the second past query;
    a second user-interaction parameter indicative of user behavior with the first search result in response to the third past query having been used to access the first search result on the search engine server;

computing, by the second MLA, a second similarity parameter for each of the second past query and third past query, the second similarity parameter being computed by:
  determining a third similarity parameter between the new query and each of the second past query and third past query, the third similarity parameter being determined based on one or more textual features of the new query and each of the second past query and third past query;
  multiplying the third similarity parameter associated with the second past query with the first user-interaction parameter; and
  multiplying the third similarity parameter associated with the third past query with the second user-interaction parameter;

in response to the second similarity parameter associated with the second past query being higher than the second similarity parameter associated with the third past query, using the second similarity parameter associated with the second past query as a ranking feature by the first MLA for ranking the associated set of search results as search results for the new query.

2. The method of claim 1, wherein the method further comprises:
  during a training phase:
    retrieving from the search log database, the plurality of search queries having been submitted on a search engine server, each of the plurality of search queries being associated with the respective set of search results, each respective search result of the respective set of search results being associated with a respective user-interaction parameter;
    computing, for each query of the plurality of search queries, a respective query vector based on the respective user-interaction parameter associated with each search result of the respective set of search results;
    computing, for each possible pair of queries within the plurality of search queries, based on the respective query vectors of each query of the pair of queries, a respective training similarity parameter, the respective training similarity parameter being indicative of a degree of similarity between queries in the pair of queries;
    generating a set of training objects, each training object of the set of training objects including an indication of a respective one of each of the possible pair of queries and the respective training similarity parameter; and
    training the second MLA on the set of training objects to determine a fourth similarity parameter of a new pair of queries, at least one query of the new pair of queries not being included in the set of training objects.

3. The method of claim 2, wherein the first user-interaction parameter being indicative of user behavior with the first search result by at least one user after having submitted the second past query to the search engine server.

4. The method of claim 2, wherein, during the training phase, the respective training similarity parameter is computed by using one of: a scalar multiplication or a cosine similarity.

5. The method of claim 4, wherein the training the second MLA on the set of training objects to determine the fourth similarity parameter of the new pair of queries is based on at least one respective textual feature of each query of the new pair of queries.

6. The method of claim 5, wherein the second MLA is a neural network.

7. The method of claim 6, wherein the first MLA is a decision tree based algorithm.

8. The method of claim 7, wherein the first MLA uses a plurality of additional features for ranking, and wherein the second similarity parameter is added to the plurality of additional features for ranking.

9. The method of claim 2, wherein the user-interaction parameter is at least one of: a dwell time and a click-through rate (CTR).

10. The method of claim 3, wherein the method further comprises, prior to the receiving of the new query:
  generating a plurality of annotations including the first annotation and second annotation; and
  storing the plurality of annotations in a storage of the server.

11. The method of claim 10, wherein the generating the plurality of annotations is executed by a third trained MLA.

12. A system for ranking search results using a first machine learning algorithm (MLA), the system executable by a second MLA on the system, the second MLA having been trained to determine query similarity, the system comprising:
  a processor;
  a non-transitory computer-readable medium comprising instructions;
  the processor, upon executing the instructions, being configured to:
    receive, by the second MLA, a new query;
    retrieve, by the second MLA from a search log database, a plurality of search queries having been submitted on a search engine server;
    compute, by the second MLA, a first similarity parameter between the new query and each query of the plurality of search queries, the first similarity parameter being determined based on one or more textual features of the new query and each query of the plurality of search queries;
    select, by the second MLA, from the plurality of search queries, a first past query associated with a highest first similarity parameter;

retrieve, by the second MLA, a set of search results associated with the first past query, the set of search results including a first search result associated with:
a first annotation including:
a second past query having been used to access the first search result on the search engine server, the second past query being different from the new query and first past query; and
a first user-interaction parameter indicative of user behavior with the first search result in response to the second past query having been used to access the first search result on the search engine server;
a second annotation including:
a third past query having been used to access the first search result on the search engine server, the third past query being different from the new query, the first past query and the second past query; and
a second user-interaction parameter indicative of user behavior with the first search result in response to the third past query having been used to access the first search result on the search engine server;
compute, by the second MLA, a second similarity parameter for each of the second past query and third past query, the second similarity parameter being computed by the processor configured to:
determine a third similarity parameter between the new query and each of the second past query and third past query, the third similarity parameter being determined based on one or more textual features of the new query and each of the second past query and third past query;
multiply the third similarity parameter associated with the second past query with the first user-interaction parameter;
multiply the third similarity parameter associated with the third past query with the second user-interaction parameter; and
in response to the second similarity parameter associated with the second past query being higher than the second similarity parameter associated with the third past query, use the second similarity parameter associated with the second past query as a ranking feature by the first MLA for ranking the associated set of search results as search results for the new query.

13. The system of claim 12, wherein the processor is further configured to:
during a training phase:
retrieve from the search log database, the plurality of search queries having been submitted on a search engine server, each of the plurality of search queries being associated with the respective set of search results, each respective search result of the respective set of search results being associated with a respective user-interaction parameter;
compute, for each query of the plurality of search queries, a respective query vector based on the respective user-interaction parameter associated with each search result of the respective set of search results;
compute, for each possible pair of queries within the plurality of search queries, based on the respective query vectors of each query of the pair of queries, a respective training similarity parameter, the respective training similarity parameter being indicative of a degree of similarity between queries in the pair of queries;
generate a set of training objects, each training object of the set of training objects including an indication of a respective one of each of the possible pair of queries and the respective training similarity parameter; and
train the second MLA on the set of training objects to determine a fourth similarity parameter of a new pair of queries, at least one query of the new pair of queries not being included in the set of training objects.

14. The system of claim 12, wherein the first user-interaction parameter being indicative of user behavior with the first search result by at least one user after having submitted the second past query to the search engine server.

15. The system of claim 13, wherein, during the training phase, the respective training similarity parameter is computed by using one of: a scalar multiplication or a cosine similarity.

16. The system of claim 15, wherein the training the second MLA on the set of training objects to determine the fourth similarity parameter of the new pair of queries is based on at least one respective textual feature of each query of the new pair of queries.

17. The system of claim 16, wherein the second MLA is a neural network.

18. The system of claim 17, wherein the first MLA is a decision tree based algorithm.

19. The system of claim 18, wherein the first MLA uses a plurality of additional features for ranking, and wherein the second similarity parameter is added to the plurality of additional features for ranking.

20. The system of claim 13, wherein the user-interaction parameter is at least one of: a dwell time and a click-through rate (CTR).

21. The system of claim 14, wherein the processor is further configured to, prior to the receiving of the new query:
generate a plurality of annotations including the first annotation and second annotation; and
store the plurality of annotations in a storage of the system.

22. The system of claim 21, wherein the generating the plurality of annotations is executed by a third trained MLA.

* * * * *